(12) United States Patent
Wang et al.

(10) Patent No.: US 12,639,464 B2
(45) Date of Patent: May 26, 2026

(54) FILE LEAK DETECTION METHOD AND DEVICE

(71) Applicant: Beijing Bytedance Network Technology Co., Ltd., Beijing (CN)

(72) Inventors: Quan Wang, Beijing (CN); Xinci Liu, Beijing (CN); Jian Yang, Beijing (CN); Xianglong Ma, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 223 days.

(21) Appl. No.: 18/567,727

(22) PCT Filed: Oct. 27, 2022

(86) PCT No.: PCT/CN2022/127891
§ 371 (c)(1),
(2) Date: Dec. 6, 2023

(87) PCT Pub. No.: WO2023/093444
PCT Pub. Date: Jun. 1, 2023

(65) Prior Publication Data
US 2024/0281548 A1 Aug. 22, 2024

(30) Foreign Application Priority Data
Nov. 29, 2021 (CN) .......................... 202111434476.2

(51) Int. Cl.
*G06F 21/62* (2013.01)
*G06F 16/14* (2019.01)
*G06F 16/16* (2019.01)

(52) U.S. Cl.
CPC ........ *G06F 21/6218* (2013.01); *G06F 16/152* (2019.01); *G06F 16/164* (2019.01)

(58) Field of Classification Search
CPC ... G06F 21/6218; G06F 16/164; G06F 16/152
(Continued)

(56) References Cited

U.S. PATENT DOCUMENTS

| | | | |
|---|---|---|---|
| 2014/0020117 A1 | 1/2014 | Nagai et al. | |
| 2016/0275303 A1 | 9/2016 | Narayanaswamy et al. | |

(Continued)

FOREIGN PATENT DOCUMENTS

| | | |
|---|---|---|
| CN | 105119925 B | 6/2018 |
| CN | 108629182 A | 10/2018 |

(Continued)

OTHER PUBLICATIONS

Japan Patent Application No. 2023-575345; Notice of Reasons for Refusal; dated May 21, 2024; 8 pages.

(Continued)

*Primary Examiner* — Zi Ye
(74) *Attorney, Agent, or Firm* — BakerHostetler

(57) ABSTRACT

Provided are a file leak detection method. The method includes: acquiring a file operation event on a terminal device, wherein the file operation event is an event in which a specified operation is executed on a target file; extracting, from the file operation event, a file path of the target file involved in the file operation event; searching for file content of the target file according to the file path, and performing mapping processing on the file content of the target file, so as to obtain a file fingerprint of the target file; determining, according to the file path and the file fingerprint, whether the target file belongs to a specified file library which is used for dynamically maintaining a service file that needs to be protected; and if the target file belongs to the specified file library, determining that a file in the specified file library is leaking.

20 Claims, 10 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2016/0301693 A1* | 10/2016 | Nikulin ................. | H04L 9/3247 |
| 2020/0089782 A1* | 3/2020 | Jain ....................... | G06F 16/128 |

FOREIGN PATENT DOCUMENTS

| | | | | | |
|---|---|---|---|---|---|
| CN | 111008405 A | | 4/2020 | | |
| CN | 111258956 A | | 6/2020 | | |
| CN | 112182604 A | * | 1/2021 | ........... | G06F 21/602 |
| CN | 112395253 A | | 2/2021 | | |
| CN | 114117530 A | | 3/2022 | | |
| JP | 2013246463 A | * | 12/2013 | | |
| JP | 2018-516025 A | | 6/2018 | | |
| JP | 2018-147203 A | | 9/2018 | | |

OTHER PUBLICATIONS

International Patent Application No. PCT/CN2022/127891; Int'l Written Opinion and Search Report; dated Jan. 6, 2023; 6 pages.

* cited by examiner

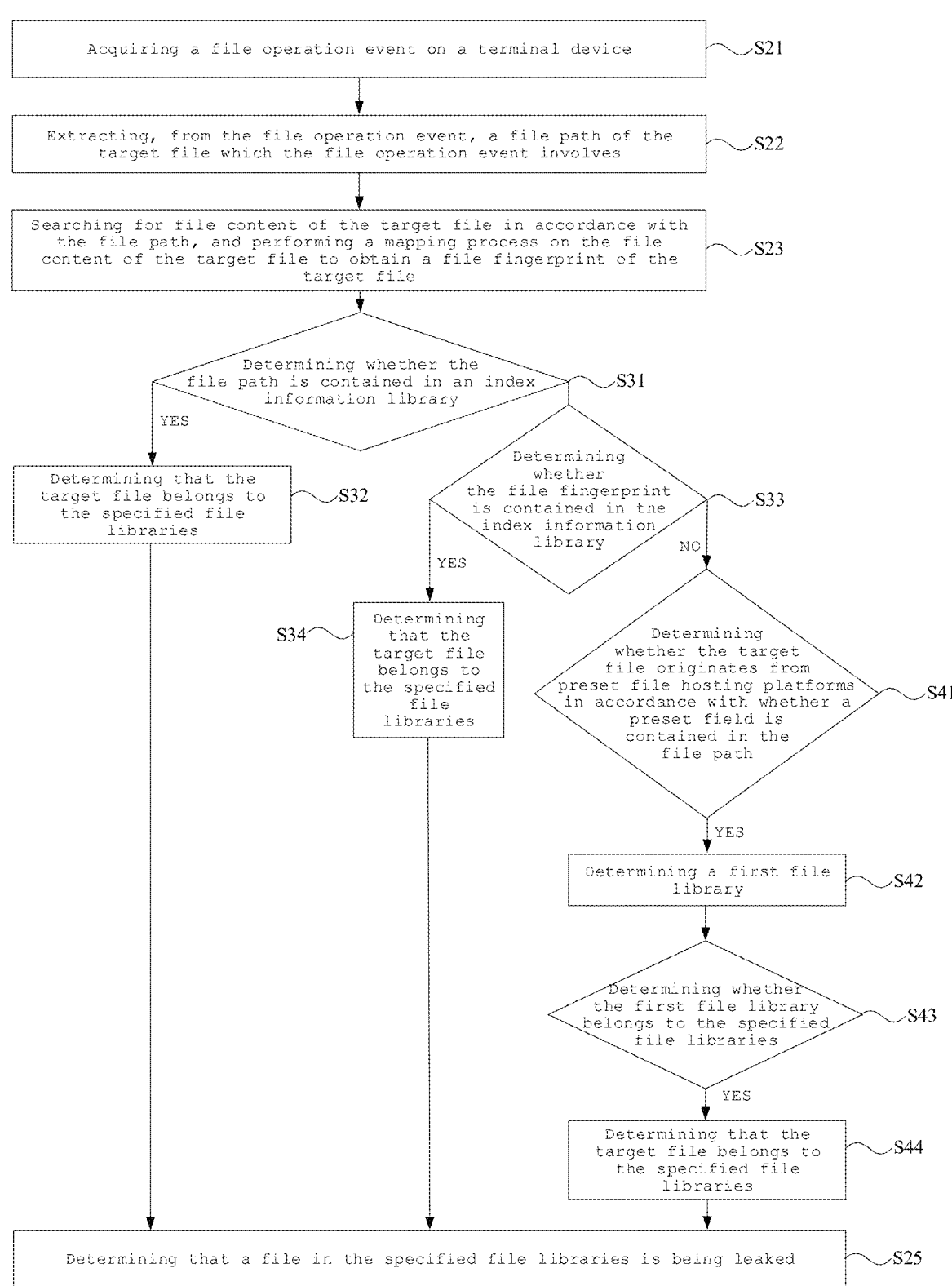

Acquiring a file operation event on a terminal device ⟩～S21

Extracting, from the file operation event, a file path of the target file which the file operation event involves ⟩～S22

Searching for file content of the target file in accordance with the file path, and performing a mapping process on the file content of the target file to obtain a file fingerprint of the target file ⟩～S23

Determining whether the file path is contained in an index information library ～S31

YES

Determining that the target file belongs to the specified file libraries ～S32

Determining whether the file fingerprint is contained in the index information library ～S33

YES

NO

S34～ Determining that the target file belongs to the specified file libraries

Determining whether the target file originates from preset file hosting platforms in accordance with whether a preset field is contained in the file path ～S41

YES

Determining a first file library ～S42

Determining whether the first file library belongs to the specified file libraries ～S43

YES

Determining that the target file belongs to the specified file libraries ～S44

Determining that a file in the specified file libraries is being leaked ⟩～S25

Fig.4

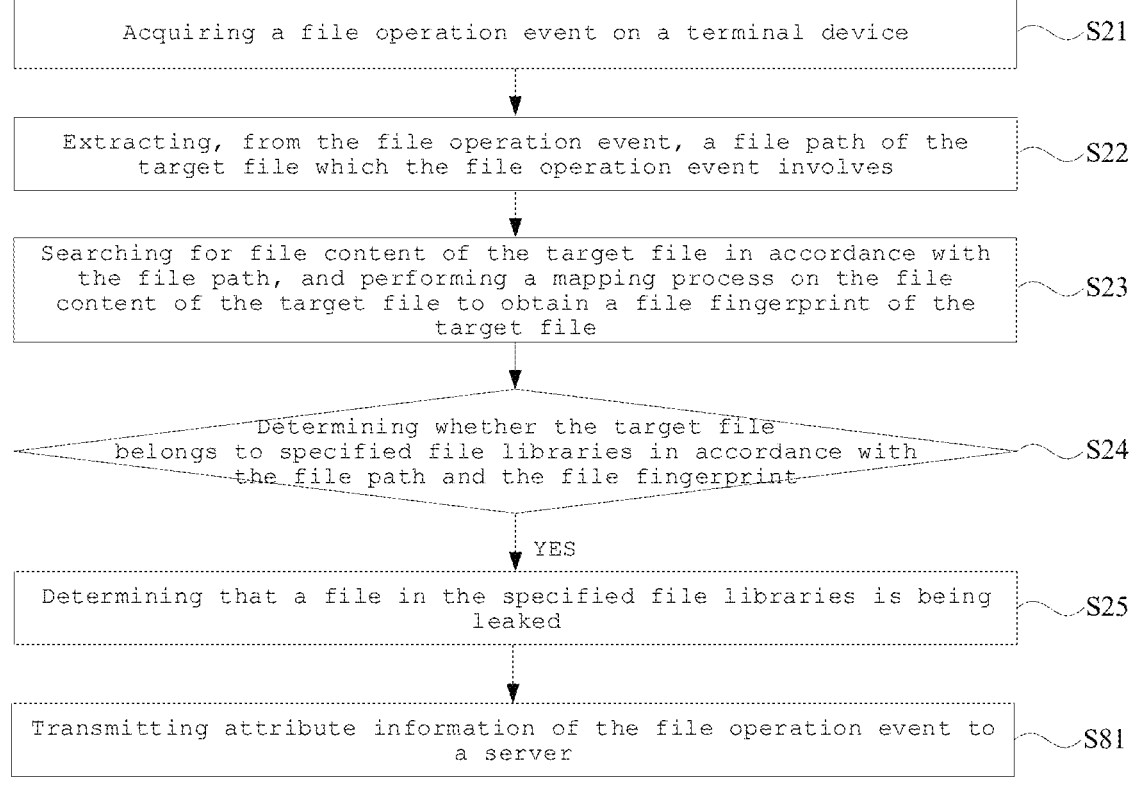

Acquiring a file operation event on a terminal device ⟶ S21

Extracting, from the file operation event, a file path of the target file which the file operation event involves ⟶ S22

Searching for file content of the target file in accordance with the file path, and performing a mapping process on the file content of the target file to obtain a file fingerprint of the target file ⟶ S23

Determining whether the target file belongs to specified file libraries in accordance with the file path and the file fingerprint ⟶ S24

YES

Determining that a file in the specified file libraries is being leaked ⟶ S25

Transmitting attribute information of the file operation event to a server ⟶ S81

Fig.8

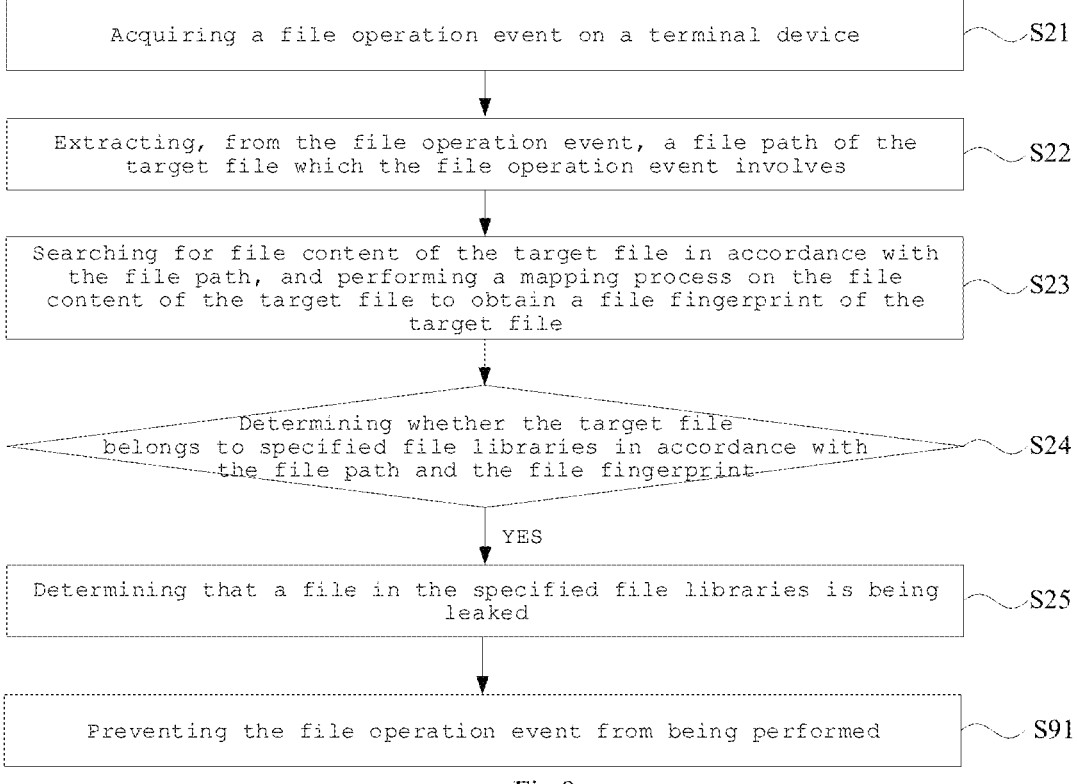

Acquiring a file operation event on a terminal device ⟩~S21

Extracting, from the file operation event, a file path of the
target file which the file operation event involves ⟩~S22

Searching for file content of the target file in accordance with
the file path, and performing a mapping process on the file
content of the target file to obtain a file fingerprint of the
target file ⟩~S23

Determining whether the target file
belongs to specified file libraries in accordance with
the file path and the file fingerprint ⟩~S24

YES

Determining that a file in the specified file libraries is being
leaked ⟩~S25

Preventing the file operation event from being performed ⟩~S91

Fig.9

FILE LEAK DETECTION METHOD AND DEVICE

CROSS-REFERENCE TO RELATED APPLICATIONS

This application is a U.S. National Stage under 35 U.S.C. § 371 of International Application No. PCT/CN2022/127891, as filed on Oct. 27, 2022, which is based on and claims the priority to the Chinese patent application No. 202111434476.2 entitled "FILE LEAK DETECTION METHOD AND DEVICE" and filed on Nov. 29, 2021. The disclosure of each of these applications is incorporated herein by reference in its entirety.

TECHNICAL FIELD

The present disclosure relates to the technical field of data security, in particular to a file leak detection method and apparatus.

BACKGROUND

Enterprise files, including project source codes, configuration files, documentation comments, as well as other related files and the like, are one of the core assets of an enterprise. However, enterprise files are confronted with various leak risks, such as stealing by external attackers, code uploading to an external platform by internal staff due to negligence, copying by employees who have left office, and the like, so timely detecting and preventing the leak of enterprise files is of significant importance for protecting core business and data security of enterprises.

SUMMARY

An embodiment of the present disclosure provides a technical solution as below:

In a first aspect, an embodiment of the present disclosure provides a file leak detection method, comprising:

acquiring a file operation event on a terminal device, wherein the file operation event is an event for performing a specified operation on a target file;

extracting, from the file operation event, a file path of the target file which the file operation event involves;

searching for file content of the target file in accordance with the file path, and performing a mapping process on the file content of the target file to obtain a file fingerprint of the target file, wherein the file fingerprint uniquely identifies the file content of the target file;

determining whether the target file belongs to specified file libraries in accordance with the file path and the file fingerprint, wherein the specified file libraries are used for dynamically maintaining business files that need to be protected; and determining that a file in the specified file libraries is being leaked, if the target file belongs to the specified file libraries.

As an optional implementation of the embodiment of the present disclosure, the determining whether the target file belongs to specified file libraries in accordance with the file path and the file fingerprint comprises:

determining whether the file path is contained in an index information library;

wherein the index information library stores a file path and a file fingerprint of at least one file in the specified file libraries;

determining that the target file belongs to the specified file libraries, if the file path is contained in the index information library;

determining whether the file fingerprint is contained in the index information library, if the file path is not contained in the index information library; and determining that the target file belongs to the specified file libraries, if the file fingerprint is contained in the index information library.

As an optional implementation of the embodiment of the present disclosure, in a case wherein the file fingerprint is not contained in the index information library, the method further comprises:

determining whether the target file originates from preset file hosting platforms in accordance with whether a preset field is contained in the file path;

determining a first file library which is a file warehouse of an item to which the target file belongs, if the target file originates from the preset file hosting platforms;

determining whether the first file library belongs to the specified file libraries; and determining that the target file belongs to the specified file libraries, if the first file library belongs to the specified file libraries.

As an optional implementation of the embodiment of the present disclosure, in a case of determining that the first file library does not belong to the specified file libraries, the method further comprises:

determining whether a same-level file, a parent file of which is the same as that of the target file, originates from the preset file hosting platforms, in accordance with whether the preset field is contained in a same-level path which is a path of the same-level file;

determining a second file library which is a file warehouse of an item to which the same-level file belongs, if the same-level file originates from the preset file hosting platforms;

determining whether the second file library belongs to the specified file libraries; and determining that the target file belongs to the specified file libraries, if the second file library belongs to the specified file libraries.

As an optional implementation of the embodiment of the present disclosure, in a case of determining that the second file library does not belong to the specified file libraries, the method further comprises:

determining whether at least one level of parent file of the target file originates from the preset file hosting platforms, in accordance with whether the preset field is contained in a parent path which is a path of the parent file;

determining a third file library which is a file warehouse of an item to which the parent file originating from the preset file hosting platforms belongs, if any level of the parent file originates from the preset file hosting platforms;

determining whether the third file library belongs to the specified file libraries; and determining that the target file belongs to the specified file libraries, if the third file library belongs to the specified file libraries.

As an optional implementation of the embodiment of the present disclosure, the method further comprises:

adding the file path and the file fingerprint into the index information library, in a case of determining that the target file belongs to the specified file libraries.

As an optional implementation of the embodiment of the present disclosure, prior to determining whether the target file belongs to specified file libraries in accordance with the file path and the file fingerprint, the method further comprises:

receiving at least one file library address transmitted by a server;

determining the specified file libraries in accordance with the at least one file library address.

As an optional implementation of the embodiment of the present disclosure, the method further comprises:

transmitting alarm information to a server, wherein the alarm information is used for indicating that a file in the specified file libraries is being leaked, in a case of determining that a file in the specified file libraries is being leaked.

As an optional implementation of the embodiment of the present disclosure, the method further comprises:

transmitting attribute information of the file operation event to a server, in a case of determining that a file in the specified file libraries is being leaked;

wherein the attribute information of the file operation event comprises at least one of identification information of the terminal device, identification information of the target file, and account information for logging in the terminal device.

As an optional implementation of the embodiment of the present disclosure, the method further comprises:

preventing the file operation event from being performed, in a case of determining that a file in the specified file libraries is being leaked.

In a second aspect, an embodiment of the present disclosure provides a file leak detection apparatus, comprising:

a detecting unit configured to acquire a file operation event on a terminal device, wherein the file operation event is an event for performing a specified operation on a target file;

an extracting unit configured to extract, from the file operation event, a file path of the target file which the file operation event involves;

an acquiring unit configured to search for file content of the target file in accordance with the file path, and perform a mapping process on the file content of the target file to obtain a file fingerprint of the target file, wherein the file fingerprint uniquely identifies the file content of the target file;

a determining unit configured to determine whether the target file belongs to specified file libraries in accordance with the file path and the file fingerprint, wherein the specified file libraries are used for dynamically maintaining business files that need to be protected; and a processing unit configured to determine that a file in the specified file libraries is being leaked, if the target file belongs to the specified file libraries.

As an optional implementation of the embodiment of the present disclosure, the determining unit is specifically configured to determine whether the file path is contained in an index information library; determine that the target file belongs to the specified file libraries, if the file path is contained in the index information library; determine whether the file fingerprint is contained in the index information library, if the file path is not contained in the index information library; and determine that the target file belongs to the specified file libraries, if the file fingerprint is contained in the index information library.

Herein, the index information library stores a file path and a file fingerprint of at least one file in the specified file libraries.

As an optional implementation of the embodiment of the present disclosure, the determining unit is further configured to, in a case wherein the file fingerprint is not contained in the index information library, determine whether the target file originates from preset file hosting platforms in accordance with whether a preset field is contained in the file path; determine a first file library which is a file warehouse of an item to which the target file belongs, if the target file originates from the preset file hosting platforms; determine whether the first file library belongs to the specified file libraries; and that the target file belongs to the specified file libraries, if the first file library belongs to the specified file libraries.

As an optional implementation of the embodiment of the present disclosure, the determining unit is further configured to, in a case of determining that the first file library does not belong to the specified file libraries, determine whether a same-level file, a parent file of which is the same as that of the target file, originates from the preset file hosting platforms, in accordance with whether the preset field is contained in a same-level path which is a path of the same-level file; determine a second file library which is a file warehouse of an item to which the same-level file belongs, if the same-level file originates from the preset file hosting platforms; determine whether the second file library belongs to the specified file libraries; and determine that the target file belongs to the specified file libraries, if the second file library belongs to the specified file libraries.

As an optional implementation of the embodiment of the present disclosure, the determining unit is further configured to, in a case of determining that the second file library does not belong to the specified file libraries, determine whether at least one level of parent file of the target file originates from the preset file hosting platforms, in accordance with whether the preset field is contained in a parent path which is a path of the parent file; determine a third file library which is a file warehouse of an item to which the parent file originating from the preset file hosting platforms belongs, if any level of the parent file originates from the preset file hosting platforms; determine whether the third file library belongs to the specified file libraries; and determine that the target file belongs to the specified file libraries, if the third file library belongs to the specified file libraries.

As an optional implementation of the embodiment of the present disclosure, the determining unit is further configured to the file path and the file fingerprint into the index information library, in a case of determining that the target file belongs to the specified file libraries.

As an optional implementation of the embodiment of the present disclosure, the determining unit is further configured to, prior to determining whether the target file belongs to specified file libraries in accordance with the file path, the file fingerprint, and the index information library, receive at least one file library address transmitted by a server; and determine the specified file libraries in accordance with the at least one file library address.

As an optional implementation of the embodiment of the present disclosure, the processing unit is further configured to transmit alarm information to a server, wherein the alarm information is used for indicating that a file in the specified file libraries is being leaked, in a case of determining that a file in the specified file libraries is being leaked.

As an optional implementation of the embodiment of the present disclosure, the processing unit is further configured to transmit attribute information of the file operation event to a server, in a case of determining that a file in the specified file libraries is being leaked;

Wherein the attribute information of the file operation event comprises at least one of identification information of the terminal device, identification information of the target file, and account information for logging in the terminal device.

As an optional implementation of the embodiment of the present disclosure, the processing unit is further configured to prevent the file operation event from being performed, in a case of determining that a file in the specified file libraries is being leaked.

In a third aspect, an embodiment of the present disclosure provides an electronic device, comprising: a memory configured to store a computer program and a processor configured to, when calls the computer program, cause the electronic device to implement the file leak detection method according to the first aspect or any one of the optional implementations of the first aspect.

In a fourth aspect, an embodiment of the present disclosure provides a non-transitory computer-readable storage medium, a computer program which, when executed by a processor, causes the processor to implement the file leak detection method according to the first aspect or any one of the optional implementations of the first aspect.

In a fifth aspect, an embodiment of the present disclosure provides a computer program product which, when executed on a computer, causes the computer to implement the file leak detection method according to the first aspect or any one of the optional implementations of the first aspect.

In a sixth aspect, an embodiment of the present disclosure provides a computer program which, when executed by a processor, causes the processor to implement the file leak detection method according to the first aspect or any one of the optional implementations of the first aspect.

BRIEF DESCRIPTION OF THE DRAWINGS

The accompanying drawings herein are incorporated in and form a part of the description; they illustrate embodiments consistent with the present disclosure and, together with the description, serve to explain the principles of the present disclosure.

In order to more clearly illustrate the technical solutions in the embodiments of the present disclosure or in the related art, the accompanying drawings that need to be used in the description of the embodiments or the related art will be briefly described below; for one of ordinary skill in the art, other related drawings can also be obtained in accordance with these drawings without paying creative efforts.

FIG. 4 shows a third flowchart of steps of a file leak detection method provided by an embodiment of the present disclosure;

FIG. 8 shows a seventh flowchart of steps of a file leak detection method provided by an embodiment of the present disclosure;

FIG. 9 shows a eighth flowchart of steps of a file leak detection method provided by an embodiment of the present disclosure;

DETAILED DESCRIPTION

Figure 1:
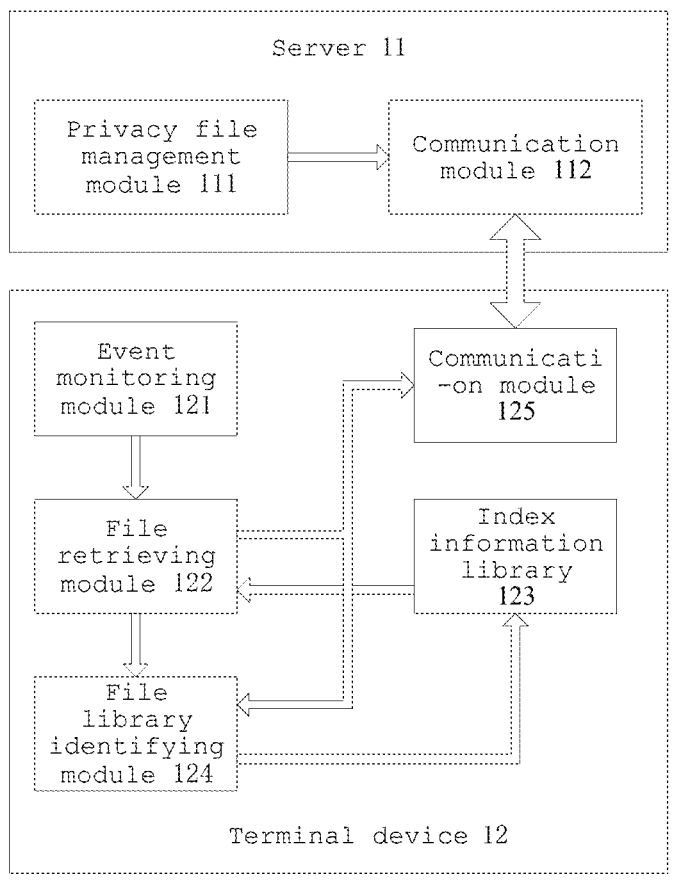
FIG. 1 shows a scene architecture diagram of a file leak detection method provided by an embodiment of the present disclosure.

In order that the above-mentioned objectives, features and advantages of the present disclosure may be understood in a more clearly manner, the solutions of the present disclosure will be further described as below. It should be noted that, in a case of no conflict, the embodiments and features in the embodiments of the present disclosure may be combined with each other.

In the following description, many specific details are set forth in order to facilitate a thorough understanding of the present disclosure, yet the present disclosure may be implemented in other ways different from those described herein; it is apparent that the embodiments in the description are merely part of the embodiments of the present disclosure, rather than all of the embodiments.

It should be noted that, for the convenience of clearly describing the technical solutions of the embodiments of the present disclosure, in the embodiments of the present disclosure, wordings such as "first", "second", etc. are employed to distinguish the same items or similar items with basically the same functions and effects, and those skilled in the art can understand that wordings such as "first", "second", etc. do not make definitions on the quantity and execution order. For example, the first feature image set and the second feature image set are only used for distinguishing different feature image sets, rather than making definitions on the order of the feature image sets.

In the embodiments of the present disclosure, expressions such as "as an example" or "for example" are used to mean an example, an instance, or an illustration. Any embodiment or design described as "as an example" or "for example" in the embodiments of the present disclosure is not necessarily to be construed as more preferred or more advantageous than other embodiments or designs. Rather, use of the expressions such as "as an example" or "for example" is intended to present relevant concepts in a concrete fashion. Further, in the description of the embodiments of the present disclosure, the meaning of "a plurality" means two or more, unless otherwise specified.

The file leak detection method commonly used in the related art is as follows: identifying whether a file is a privacy file by detecting whether the file contains specified keywords, and then determining whether file leak is occurring. However, in the process of identifying whether the file is the privacy file by whether specified keywords are contained, if the range of specified keywords is too narrow, failure to report will occur, so that the leak of the privacy file cannot be detected, and if the range of specified keywords is too wide, misreport will occur, which will affect the execution of the normal file operation event.

A file leak detection method provided by an embodiment of the present disclosure comprises: first, acquiring a file operation event on a terminal device, wherein the file operation event is an event for performing a specified operation on a target file; then, extracting, from the file operation event, a file path of the target file which the file operation event involves; subsequently, searching for file content of the target file in accordance with the file path, and performing a mapping process on the file content of the target file to obtain a file fingerprint of the target file; finally, determining whether the target file belongs to specified file libraries in accordance with the file path and the file fingerprint, wherein the specified file libraries are used for dynamically maintaining business files that need to be protected; and, determining that a file in the specified file libraries is being leaked, if the target file belongs to the specified file libraries. Compared with the detection of file leak through specified keywords, the file leak detection method provided by the embodiment of the present disclosure can determine whether a file belongs to specified file libraries in two dimensions, namely through a file path and a file fingerprint of the file, and therefore the embodiment of the present disclosure can reduce miss detection and false detection in the process of detecting whether a file belongs to specified file libraries or not, thereby improving the accuracy of file leak detection.

First, a scene architecture of a file leak detection method provided by an embodiment of the present disclosure is described as follows.

Referring to FIG. 1, a scene architecture of a file leak detection method provided by an embodiment of the present disclosure includes a server 11 and a terminal device 12.

Herein the server 11 includes a privacy file management module 111 and a communication module 112. The privacy file management module 111 has an Application Programming Interface (API) exposed to the outside. Through the API exposed to the outside of the privacy file management module 111, an administrator can configure the file library addresses where the documents which are not intended to be transmitted outside are located, such as a Git item address, a SVN item address, and the like, and perform operations such as addition, deletion or modification on the already configured file library addresses. The communication module 112 is configured to transmit the file library addresses configured by the administrator to the terminal device 11, and to receive information reported by the terminal device 11, such as alarm information that a file in specified file libraries is leaked, attribute information of an operation event which leaks a file in specified file libraries, and the like.

The terminal device 12 includes an event monitoring module 121, a file retrieving module 122, an index information library 123, a file library identifying module 124, and a communication module 125. The event monitoring module 121 is configured to detect all process events on the terminal device, and determine whether each process event is an operation event that may leak a file in specified file libraries, such as outbound transmitting of a file, copying of a file, and the like, and to, when it is determined that a certain event is an event that may leak a file in specified file libraries, transmit relevant information of the operation event to the file retrieving module 122, so as to further determine whether a file in specified file libraries is being leaked. The file retrieving module 122 acquires a file path and a file fingerprint of a target file operated by the operation event that may leak a file in specified file libraries, determines whether the target file is a file in the specified file libraries based on the paths and the Hash values stored in the index information library 123, and determines that a file in the specified file libraries is being leaked, when the target file is determined to be a file in the specified file libraries. The file library identifying module 124 is configured to further determine whether a file warehouse of an item, to which a same-level file or a parent file of the target file belongs, belongs to the specified file libraries, when the file retrieving module 122 determines that the file path and the file fingerprint of the target file are not contained in the index information library 123, and to determine that a file in the specified file libraries is being leaked when the file warehouse of the item, to which the same-level file or the parent file of the target file belongs, belongs to the specified file libraries, and to add the file path and the file fingerprint of the target file into the index information library 123. The communication module 125 is configured to receive the file library addresses transmitted by the server 11 and to transmit information, such as the alarm information, the attribute information of the file operation event, and the like to the server 11.

Figure 2:
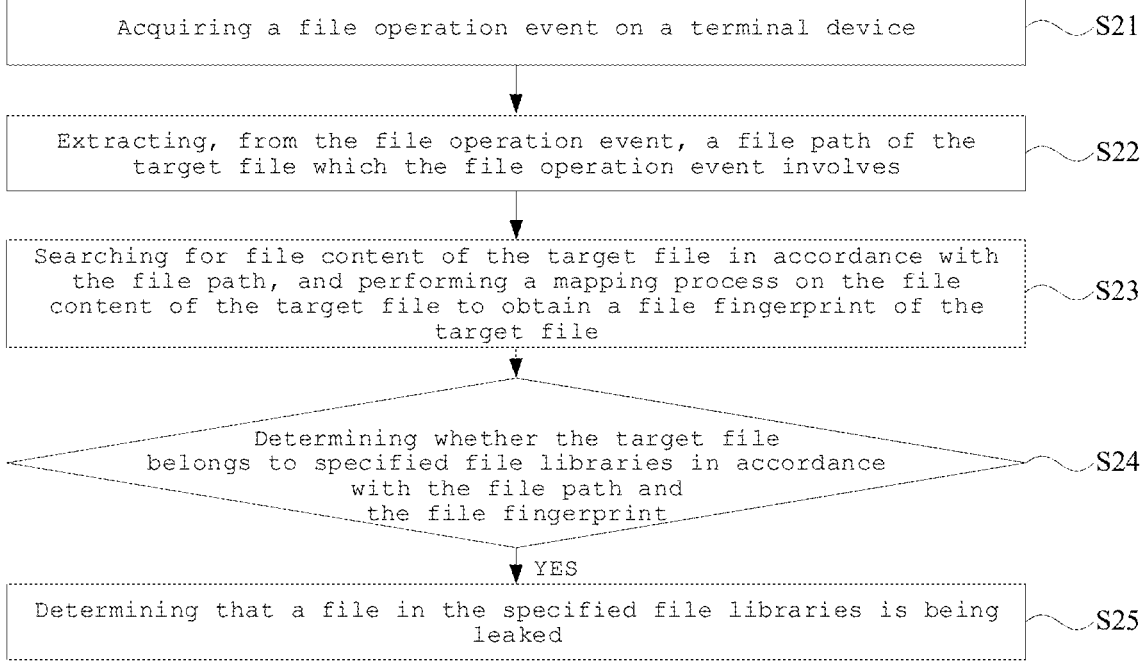
FIG. 2 shows a first flowchart of steps of a file leak detection method provided by an embodiment of the present disclosure.

Based on the above contents, an embodiment of the present disclosure provides a file leak detection method applied to a terminal device, and referring to FIG. 2, the file leak detection method provided by the embodiment of the present disclosure comprises the following steps:

S21, acquiring a file operation event on a terminal device.

Herein, the file operation event is an event for performing a specified operation on a target file.

The specified operation in the embodiment of the present disclosure may include various file operations that may cause a file in specified file libraries to be leaked. Exemplarily, the specified operation may include: an operation of copying a file, an event of uploading a file to a network platform, an operation of transmitting a file to an external network, and the like.

The file in the embodiments of the present disclosure may be any type of files. For example, the file may include a source code, a document, a configuration file, an image, a video file, an audio file, a compilation product, and the like.

Optionally, the terminal device may detect in real time whether each operation event on the terminal device is an operation event related to a file, further determine whether an operation which the operation event involves is a specified operation, when it is determined that a certain operation event is an operation event related to a file, and determine that the operation event is the file operation event in the embodiment of the present disclosure, when it is determined that the operation which the operation event involves is a specified operation.

S22, extracting, from the file operation event, a file path of the target file which the file operation event involves.

Specifically, the file path of the target file refers to a storage route through which the target file is read. For example, when a certain file entitled 'first draft' is read, the storage route to be went through sequentially includes: system disk C, Users folder, zhangsan folder, Desktop folder, KP2116216.4 folder, then the file path of the file is: C:\Users\zhangsan\Desktop\KP2116216.4\first draft.

S23, searching for file content of the target file in accordance with the file path, and performing a mapping process on the file content of the target file to obtain a file fingerprint of the target file.

Herein, the file fingerprint uniquely identifies the file content of the target file.

Optionally, the file fingerprint of the target file may be a Hash value of the target file.

That is, first reading the target file in accordance with the file path of the target file, and then performing the mapping process on the file content of the target file to obtain a file fingerprint of the target file.

S24, determining whether the target file belongs to specified file libraries in accordance with the file path and the file fingerprint.

Herein, the specified file libraries are used for dynamically maintaining business files that need to be protected.

The business files that need to be protected in the embodiment of the present disclosure refer to files that are not intended to be leaked. Business files that need to be protected may include an enterprise source code, a document, a configuration file, an image, a video file, an audio file, a compilation product, and the like. The specified file libraries being used for dynamically maintaining business files that need to be protected means that, addition, modification, and deletion may be dynamically performed on the files in the specified file libraries, so as to dynamically manage the business files that need to be protected.

As an optional implementation of the embodiment of the present disclosure, the above step S24 (determining whether the target file belongs to specified file libraries in accordance with the file path and the file fingerprint) comprises:

determining whether the file path and the file fingerprint are contained in an index information library; wherein the index information library stores a file path and a file fingerprint of at least one file in the specified file libraries;

determining that the target file belongs to the specified file libraries, if the file path and/or the file fingerprint are/is contained in the index information library.

Optionally, the index information library may store the paths and the fingerprints of the files in the specified file libraries in the manner as shown in Table 1 below.

TABLE 1

| File Name | File Path | File Hash Value |
|---|---|---|
| File A | File Path A | File Fingerprint A |
| File B | File Path B | File Fingerprint B |
| File C | File Path C | File Fingerprint C |
| . | . | . |
| . | . | . |
| . | . | . |

As shown in Table 1 above, the index information library may be a Key-Value database, wherein the file name of the file is referred as the key and the path and the fingerprint of the file are stored as the value.

Optionally, an implementation for determining whether the target file belongs to specified file libraries in accordance with the file path, the file fingerprint, and the index information library may comprise:

traversing the file paths and the file fingerprints in the index database, determining that the target file belongs to the specified file libraries, if the file path and/or the file fingerprint are/is contained in the index database, and determining that the target file does not belong to the specified file libraries, if the file path or the file fingerprint is not contained in the index database.

It should be noted that, the path of a file in the embodiment of the present disclosure refers to a full path of the file.

That is, the file path includes the name of the file, and thus determining whether the target file belongs to the specified file libraries in accordance with the file path, the file fingerprint, and the index information library may be understood as determining whether the target file belongs to the specified file libraries in accordance with the name of the target file, the file path, the file fingerprint, and the index information library.

As an optional implementation of the embodiment of the present disclosure, prior to the above step S24 (determining whether the target file belongs to specified file libraries in accordance with the file path and the file fingerprint), the file leak detection method provided by an embodiment of the present disclosure further comprises:

receiving at least one file library address transmitted by a server; and determining the specified file libraries in accordance with the at least one file library address.

That is, the terminal device needs to first acquire, from the server, the configuration as to files in which file libraries need to be prevented from being leaked, and the specific acquisition manner is as follows: receiving the file library addresses transmitted by the server, and determining the file libraries identified by the respective file library addresses as the specified file libraries.

In the above step S24, if it is determined that the target file belongs to the specified file libraries, the following step S25 is performed.

S25, determining that a file in the specified file libraries is being leaked.

A file leak detection method provided by an embodiment of the present disclosure comprises: first, acquiring a file operation event for performing a specified operation on a target file on a terminal device; then, extracting, from the file operation event, a file path of the target file which the file operation event involves; subsequently, searching for file content of the target file in accordance with the file path, and performing a mapping process on the file content of the target file to obtain a file fingerprint of the target file; finally, determining whether the target file belongs to specified file libraries in accordance with the file path and the file fingerprint, wherein the specified file libraries are used for dynamically maintaining business files that need to be protected; and determining that a file in the specified file libraries is being leaked, if the target file belongs to the specified file libraries. Compared with the detection of file leak through specified keywords, the file leak detection method provided by the embodiment of the present disclosure can determine whether a file belongs to specified file libraries in two dimensions, namely through a file path and a file fingerprint of the file, and therefore the embodiment of the present disclosure can reduce miss detection and false detection in the process of detecting whether a file belongs to specified file libraries or not, thereby improving the accuracy of file leak detection.

Figure 3:
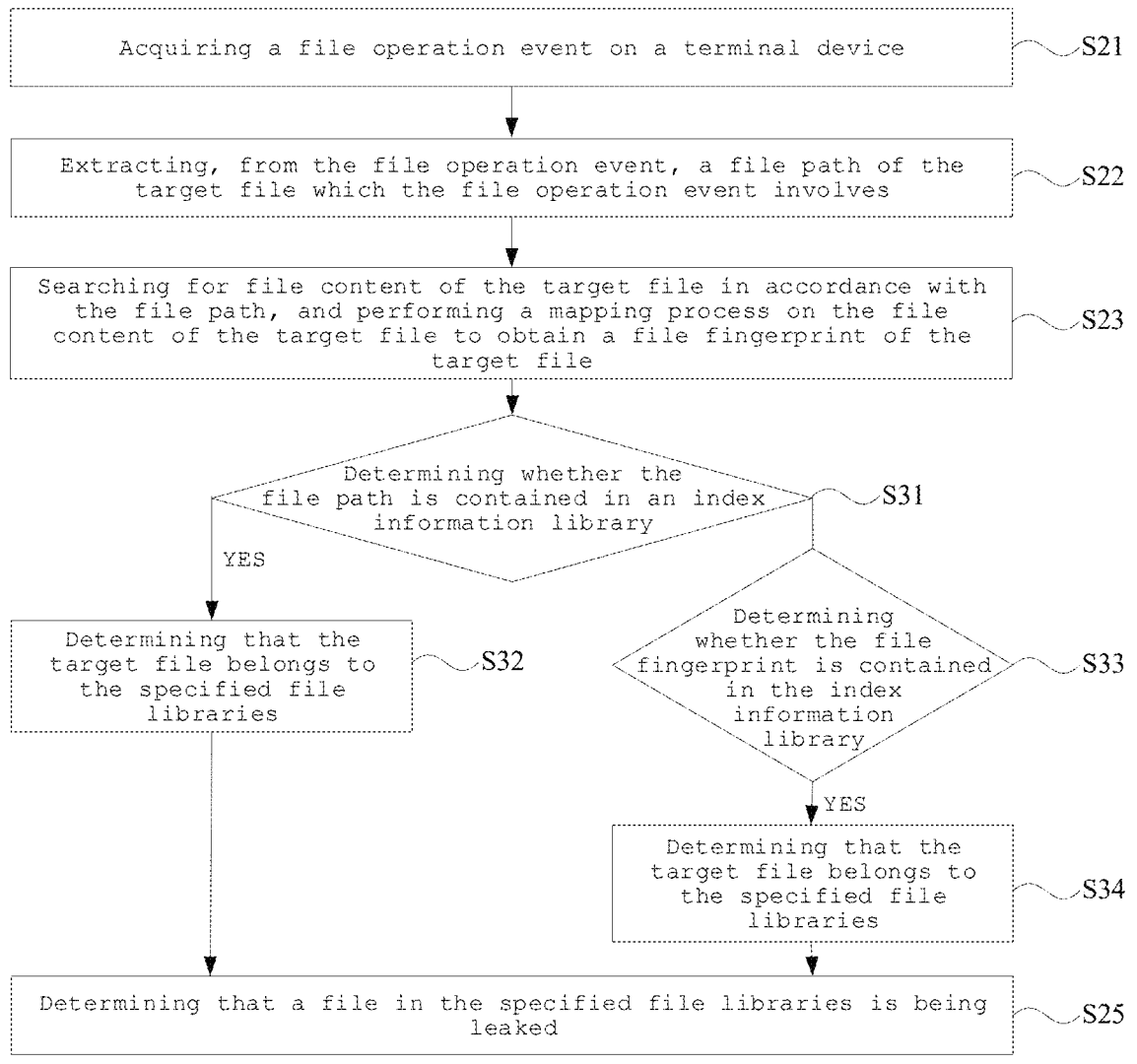
FIG. 3 shows a second flowchart of steps of a file leak detection method provided by an embodiment of the present disclosure.

As an optional implementation of the embodiment of the present disclosure, on the basis of the embodiment as shown in FIG. 2, referring to FIG. 3, one implementation of the above step S24 (determining whether the target file belongs to specified file libraries in accordance with the file path and the file fingerprint) comprises the following steps S31 to S34:

S31, determining whether the file path is contained in the index information library.

Herein, the index information library stores a file path and a file fingerprint of at least one file in the specified file libraries.

Specifically, the respective file paths stored in the index information library may be traversed, and it is determined whether there is a file path that is completely the same as the file path in the index information library, so as to determine whether the file path is contained in the index information library.

In the above step S31, if it is determined that the file path is contained in the index information library, the following step S32 is performed.

S32, determining that the target file belongs to the specified file libraries.

In the above step S31, if it is determined that the file path is not contained in the index information library, the following step S33 is performed.

S33, determining whether the file fingerprint is contained in the index information library.

Likewise, the respective file fingerprints stored in the index information library may be traversed, and it is determined whether there is a file fingerprint that is completely the same as the file fingerprint in the index information library, so as to determine whether the file fingerprint is contained in the index information library.

In the above step S33, if it is determined that the file fingerprint is contained in the index information library, the following step S34 is performed.

S34, determining that the target file belongs to the specified file libraries.

On one hand, when the file path is not contained in the index information library, the above embodiment will further determine whether the file fingerprint is contained in the index information library, and determine that the target file belongs to the specified file libraries, in a case wherein the file fingerprint is contained in the index information library, and therefore the above embodiment can avoid the file in the specified file libraries from being first copied to another storage position (the file path is changed), and then being leaked by way of copying, outbound transmitting, or the like, thereby further improving security of the files in the specified file libraries.

On the other hand, it is the case in the embodiment of the present disclosure that whether a file path belongs to the retrieved database is detected first, and it is directly determined that the file belongs to the retrieved database when the file path belongs to the retrieved database, and whether a file fingerprint belongs to the retrieved database is not further determined, so that the above embodiment can further reduce the data processing amount in the file retrieval process, thereby improving the efficiency of data file leak detection.

As an optional implementation of the embodiment of the present disclosure, on the basis of the embodiment as shown in FIG. 3, referring to FIG. 4, in a case wherein the file fingerprint is not contained in the index information library, the file leak detection method provided by the embodiment of the present disclosure further comprises the following steps S41 to S44:

S41, determining whether the target file originates from preset file hosting platforms, in accordance with whether a preset field is contained in the file path.

Exemplarily, the preset field can include: .git and .svn.

Specifically, based on the demands on research and development and on operation and maintenance, enterprises often upload files to an internal file hosting platform, which files can be directly pulled from the internal file hosting platform when demands for using these files arise, and the paths of the files pulled from the file hosting platform will all be written into corresponding fields. For example, if a code is hosted to the git platform or the svn platform, the field ".git" or ".svn" will be contained in the path of the code pulled from the git platform or the svn platform.

Specifically, determining whether the target file originates from preset file hosting platforms, in accordance with whether a preset field is contained in the file path, comprises:

determining that the target file originates from preset file hosting platforms, when the preset field is contained in the file path;

determining that the target file does not originate from preset file hosting platforms, when the preset field is not contained in the file path.

In the above step S41, if it is determined that the target file originates from the preset file hosting platforms, the following step S42 is performed.

S42, determining a first file library.

Herein, the first file library is a file warehouse of an item to which the target file belongs.

Specifically, when the preset field is git, the file warehouse address of the item to which the target file belongs can be acquired by analyzing the git directory, so that a first warehouse is determined, and when the preset field is .svn, the file warehouse address of the item to which the target file belongs can be acquired by analyzing the .svn directory, so that a first warehouse is determined.

S43, determining whether the first file library belongs to the specified file libraries.

Specifically, whether the first file library belongs to the specified file libraries or not can be determined by comparing whether the address of the first file library belongs to the addresses of the specified file libraries or not.

In the above step S43, if it is determined that the first file library belongs to the specified file libraries, the following step S44 is performed.

S44, determining that the target file belongs to the specified file libraries.

In a case wherein the file fingerprint is not contained in the index information library, the above embodiment further determines whether the target file originates from preset file hosting platforms, in accordance with whether a preset field is contained in the file path; obtains the file warehouse of the item to which the target file belongs, in a case wherein the target file originates from preset file hosting platforms; determines whether the file warehouse of the item, to which the target file belongs, belongs to the specified file libraries; and determines that the target file belongs to the specified file libraries, in a case wherein the file warehouse of the item, to which the target file belongs, belongs to the specified file libraries; therefore, the above embodiment can prevent a sensitive file in the specified file libraries from being first uploaded to the file hosting platform and then downloaded from the file hosting platform and leaked, thereby realizing a more comprehensive detection of the leak action of the file in the specified file libraries.

As an optional implementation of the embodiment of the present disclosure, the file leak detection method provided by the embodiment of the present disclosure further comprises:

adding the file path and the file fingerprint into the index information library, in a case of determining that the first file library belongs to the specified file libraries.

Adding the file path and the file fingerprint into the index information library when determining that the target file belongs to the specified file libraries, may facilitate subsequent detection of leak actions of the files in the specified file libraries directly in accordance with the index information library, thereby improving the efficiency in file leak detection.

Figure 5:
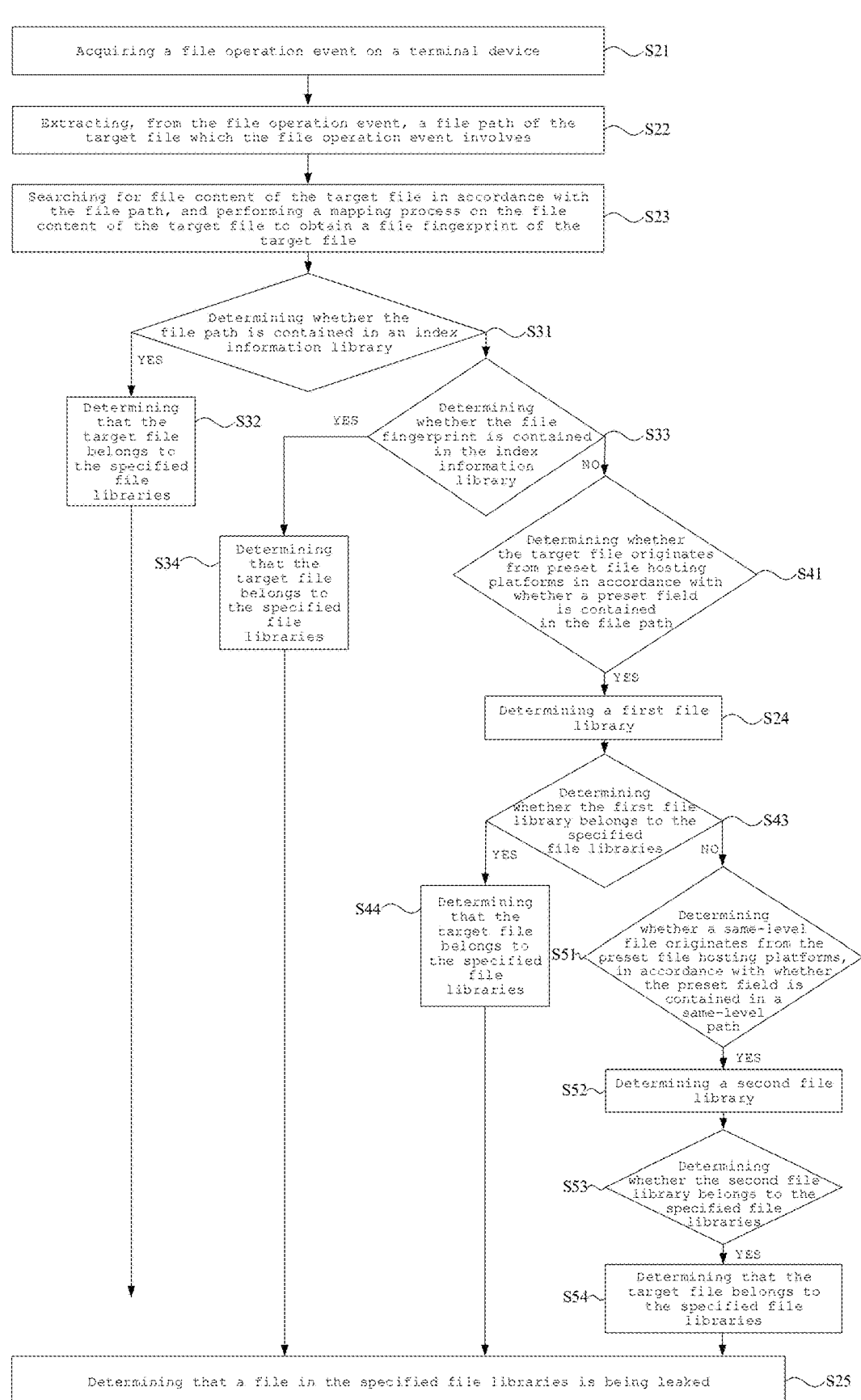
FIG. 5 shows a fourth flowchart of steps of a file leak detection method provided by an embodiment of the present disclosure.

As an optional implementation of the embodiment of the present disclosure, on the basis of the embodiment as shown in FIG. 4, referring to FIG. 5, in a case of determining that the first file library does not belong to the specified file libraries, the file leak detection method provided by the embodiment of the present disclosure further comprises the following steps S51 to S54:

S51, determining whether a same-level file originates from the preset file hosting platforms, in accordance with whether the preset field is contained in a same-level path.

Herein, the same-level path is a path of the same-level file, a parent file of which is the same as that of the target file.

For example, the file "first draft" is the target file in the embodiment of the present disclosure, the file path of the file "first draft" is C:\Users\zhangsan\Desktop\KP2116216.4\first draft, and the parent file of the file "first draft" is KP2116216.4; and if a file with the file name "second draft" is further present under the parent file KP2116216.4 of the file "first draft", the file "second draft" is the same-level file of the file "first draft", and the path C:\Users\zhangsan\Desktop\KP2116216.4\second draft of the file "second draft" is the same-level path in the embodiment of the present disclosure.

In the above step S51, if it is determined that the same-level file originates from the preset file hosting platforms, the following step S52 is performed.

S52, determining a second file library.

Herein, the second file library is a file warehouse of an item to which the same-level file belongs.

S53, determining whether the second file library belongs to the specified file libraries.

In the above step S53, if it is determined that the second file library belongs to the specified file libraries, the following step S54 is performed.

S54, determining that the target file belongs to the specified file libraries.

In a case of determining that the first file library does not belong to the specified file libraries, the above embodiment further determines whether the same-level file originates from preset file hosting platforms in accordance with whether the preset field is contained in the same-level path; obtains the file warehouse of the item to which the same-level file belongs, in a case wherein the same-level file originates from the preset file hosting platforms; determines whether the file warehouse of the item, to which the same-level file belongs, belongs to the specified file libraries; and determines that the target file belongs to the specified file libraries, in a case wherein the file warehouse of the item, to which the same-level file belongs, belongs to the specified file libraries, therefore, the above embodiment can realize a more comprehensive detection of the leak actions of the files in the specified file libraries.

As an optional implementation of the embodiment of the present disclosure, the file leak detection method provided by the embodiment of the present disclosure further comprises:

adding the file path and the file fingerprint into the index information library, in a case of determining that the second file library belongs to the specified file libraries.

Adding the file path and the file fingerprint into the index information library when determining that the second file library belongs to the specified file libraries, may facilitate subsequent detection of leak actions of the files in the specified file libraries directly in accordance with the index information library, thereby improving the efficiency in file leak detection.

Figure 6:
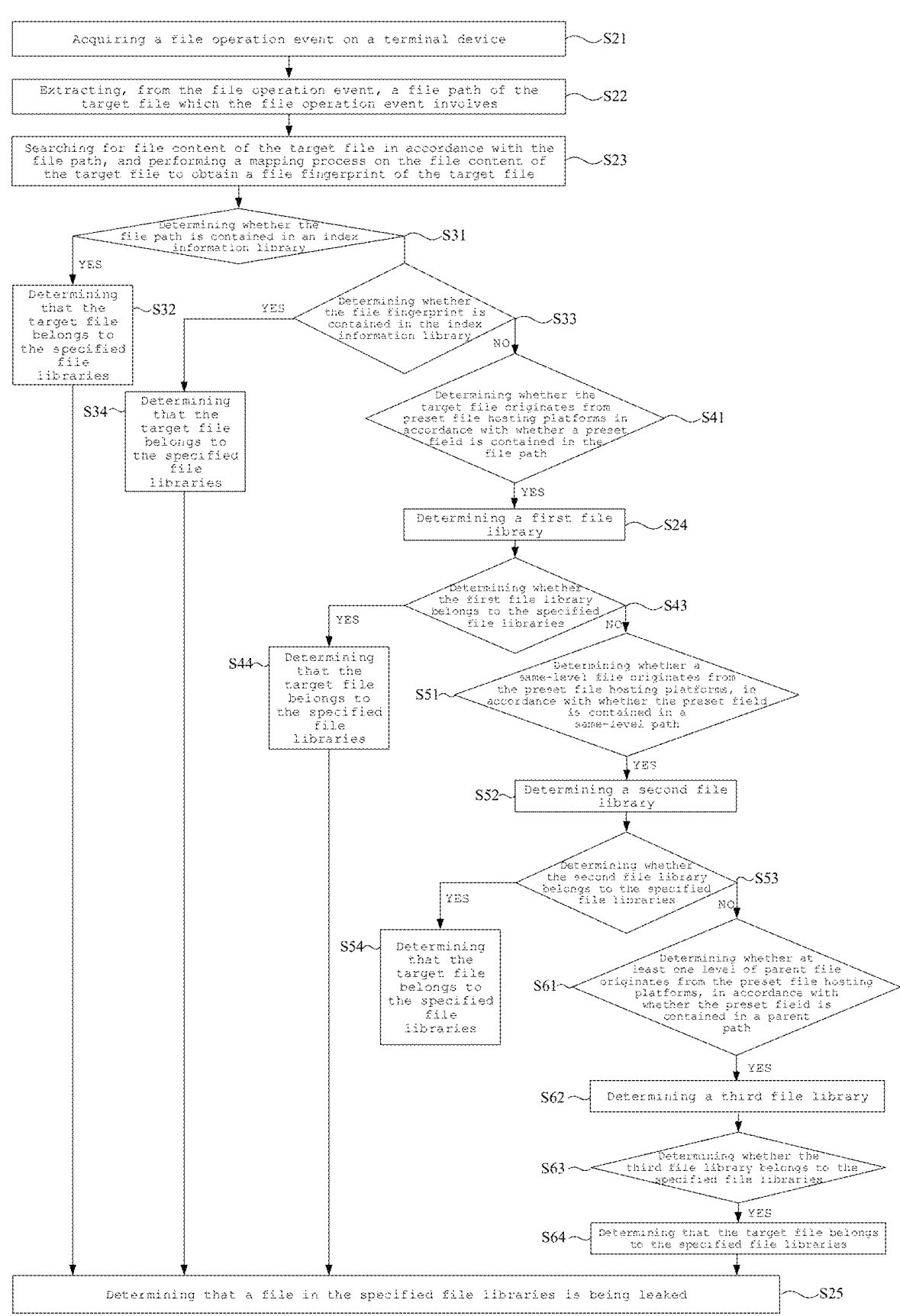
FIG. 6 shows a fifth flowchart of steps of a file leak detection method provided by an embodiment of the present disclosure.

As an optional implementation of the embodiment of the present disclosure, on the basis of the embodiment as shown in FIG. 5, referring to FIG. 6, in a case of determining that the second file library does not belong to the specified file libraries, the file leak detection method provided by the embodiment of the present disclosure further comprises the following steps S61 to S64:

S61, determining whether at least one level of parent file originates from the preset file hosting platforms, in accordance with whether the preset field is contained in a parent path.

Herein, the parent path is a path of the parent file of the target file.

Exemplarily, at least one level of parent file may be three levels. That is, sequentially looking up three levels in directory upward.

In the above step S61, if it is determined that any level of parent file originates from the preset file hosting platforms, the following step S62 is performed.

S62, determining a third file library.

Herein, the third file library is a file warehouse of an item to which the parent file originating from the preset file hosting platforms belongs.

S63, determining whether the third file library belongs to the specified file libraries.

In the above step S63, if it is determined that the third file library belongs to the specified file libraries, the following step S64 is performed.

S64, determining that the target file belongs to the specified file libraries.

In a case of determining that the second file library does not belong to the specified file libraries, the above embodiment further determines whether the preset field is contained in at least one level of parent path; obtains the file warehouse of the item to which the parent file corresponding to this level of parent path belongs, in a case wherein the preset field is contained in at least one level of parent path; determines whether the file warehouse of the item, to which the parent file belongs, belongs to the specified file libraries; and determines that the target file belongs to the specified file libraries, in a case wherein the file warehouse of the item, to which the parent file belongs, belongs to the specified file libraries. Therefore, the above embodiment can realize a more comprehensive detection of the leak actions of the files in the specified file libraries.

As an optional implementation of the embodiment of the present disclosure, the file leak detection method provided by the embodiment of the present disclosure further comprises:

adding the file path and the file fingerprint into the index information library, in a case of determining that the third file library belongs to the specified file libraries.

Adding the file path and the file fingerprint into the index information library when determining that the third file library belongs to the specified file libraries, may facilitate subsequent detection of leak actions of the files in the specified file libraries directly in accordance with the index information library, thereby improving the efficiency in file leak detection.

Figure 7:
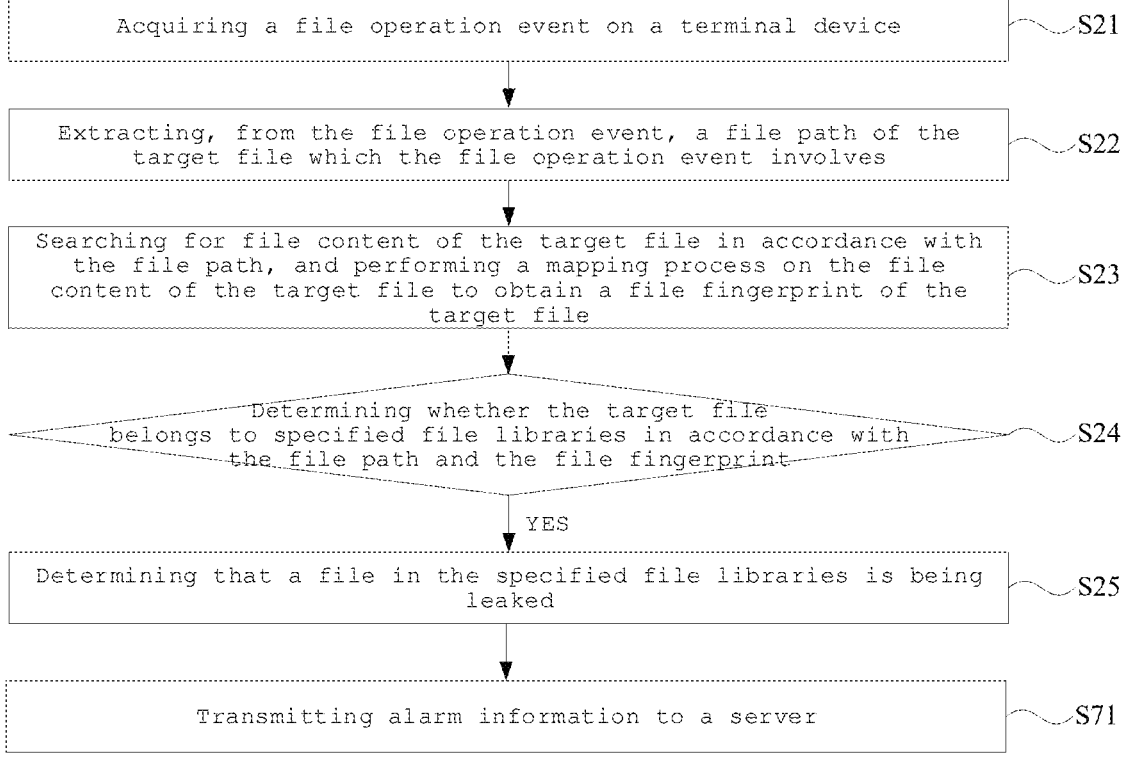
FIG. 7 shows a sixth flowchart of steps of a file leak detection method provided by an embodiment of the present disclosure.

As an optional implementation of the embodiment of the present disclosure, on the basis of the embodiment as shown in FIG. 1, referring to FIG. 7, in a case of determining that a file in the specified file libraries is being leaked, the file leak detection method provided by the embodiment of the present disclosure further comprises:

S71, transmitting alarm information to a server.

Herein, the alarm information is used for indicating that a file in the specified file libraries is being leaked.

Timely transmitting alarm information to the server upon realizing that a file in the specified file libraries is being leaked may cause the information security personnel to stop the leak actions in time.

As an optional implementation of the embodiment of the present disclosure, on the basis of the embodiment as shown in FIG. 1, referring to FIG. 8, in a case of determining that a file in the specified file libraries is being leaked, the file leak detection method provided by the embodiment of the present disclosure further comprises:

S81, transmitting attribute information of the file operation event to a server.

Herein, the attribute information of the file operation event comprises at least one of identification information of the terminal device, identification information of the target file, and account information for logging in the terminal device.

Upon realizing that a file in the specified file libraries is being leaked, the above embodiment transmits the identification information of the terminal device, the identification information of the target file, and the account information for logging in the terminal device to the server; therefore, the above embodiment can facilitate investigation and affixing of the responsibilities for the leak actions.

As an optional implementation of the embodiment of the present disclosure, on the basis of the embodiment as shown in FIG. 1, referring to FIG. 9, in a case of determining that a file in the specified file libraries is being leaked, the file leak detection method provided by the embodiment of the present disclosure further comprises:

S91, preventing the file operation event from being performed.

Upon realizing that a file in the specified file libraries is being leaked, the above embodiment prevents the file operation event from being performed; therefore, the above embodiment can timely prevent the files in the specified file libraries from being leaked, upon realizing that a file in the specified file libraries is being leaked.

Based on the same inventive concept, as an implementation of the above method, the embodiment of the present disclosure further provides a file leak detection apparatus which corresponds to the above-mentioned method embodiment; for the sake of convenience in reading, details in the above-mentioned method embodiment are not described again in the apparatus embodiment, but it should be clear that the file leak detection apparatus in the present embodiment can correspondingly implement all contents in the above-mentioned method embodiment.

Figure 10:
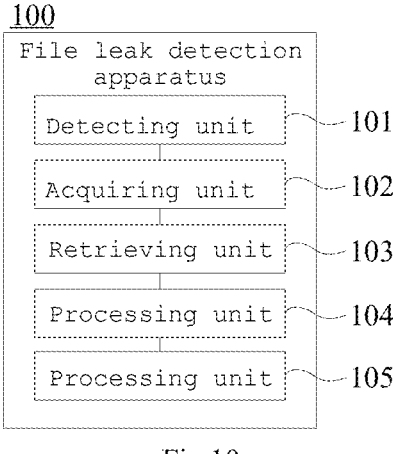
FIG. 10 shows a schematic diagram of a file leak detection apparatus provided by an embodiment of the present disclosure.

The embodiment of the present disclosure provides a file leak detection apparatus, and FIG. 10 shows a schematic diagram of the file leak detection apparatus; as shown in FIG. 10, the file leak detection apparatus 100 comprises:

a detecting unit 101 configured to acquire a file operation event on a terminal device, wherein the file operation event is an event for performing a specified operation on a target file;

an extracting unit 102 configured to extract, from the file operation event, a file path of the target file which the file operation event involves;

an acquiring unit 103 configured to search for file content of the target file in accordance with the file path, and perform a mapping process on the file content of the target file to obtain a file fingerprint of the target file, wherein the file fingerprint uniquely identifies the file content of the target file;

a determining unit 104 configured to determine whether the target file belongs to specified file libraries in accordance with the file path and the file fingerprint, wherein the specified file libraries are used for dynamically maintaining business files that need to be protected; and a processing unit 105 configured to determine that a file in the specified file libraries is being leaked, in a case wherein the target file belongs to the specified file libraries.

As an optional implementation of the embodiment of the present disclosure, the determining unit 104 is specifically configured to determine whether the file path is contained in an index information library; determine that the target file belongs to the specified file libraries, if the file path is contained in the index information library; determine whether the file fingerprint is contained in the index information library, if the file path is not contained in the index information library; and determine that the target file belongs to the specified file libraries, if the file fingerprint is contained in the index information library.

Herein, the index information library stores a file path and a file fingerprint of at least one file in the specified file libraries.

As an optional implementation of the embodiment of the present disclosure, the determining unit 104 is further configured to, in a case wherein the file fingerprint is not contained in the index information library, determine whether the target file originates from preset file hosting platforms in accordance with whether a preset field is contained in the file path; determine a first file library which is a file warehouse of an item to which the target file belongs, if the target file originates from the preset file hosting platforms; determine whether the first file library belongs to the specified file libraries; and to determine that the target file belongs to the specified file libraries, if the first file library belongs to the specified file libraries.

As an optional implementation of the embodiment of the present disclosure, the determining unit 104 is further configured to, in a case of determining that the first file library does not belong to the specified file libraries, determine whether a same-level file, a parent file of which is the same as that of the target file, originates from the preset file hosting platforms, in accordance with whether the preset field is contained in a same-level path which is a path of the same-level file; determine a second file library which is a file warehouse of an item to which the same-level file belongs, if the same-level file originates from the preset file hosting platforms; determine whether the second file library belongs to the specified file libraries; and determine that the target file belongs to the specified file libraries, if the second file library belongs to the specified file libraries.

As an optional implementation of the embodiment of the present disclosure, the determining unit 104 is further configured to, in a case of determining that the second file library does not belong to the specified file libraries, determine whether at least one level of parent file of the target file originates from the preset file hosting platforms, in accordance with whether the preset field is contained in a parent path which is a path of the parent file; determine a third file library which is a file warehouse of an item to which the parent file originating from the preset file hosting platforms belongs, if any level of parent file originates from the preset file hosting platforms; determine whether the third file library belongs to the specified file libraries; and determine that the target file belongs to the specified file libraries, if the third file library belongs to the specified file libraries.

As an optional implementation of the embodiment of the present disclosure, the determining unit 104 is further configured to add the file path and the file fingerprint into the index information library, in a case of determining that the target file belongs to the specified file libraries.

As an optional implementation of the embodiment of the present disclosure, the determining unit 104 is further configured to, prior to determining whether the target file belongs to the specified file libraries in accordance with the file path, the file fingerprint, and the index information library, receive at least one file library address transmitted by a server; and determine the specified file libraries in accordance with the at least one file library address.

As an optional implementation of the embodiment of the present disclosure, the processing unit 105 is further configured to transmit alarm information to a server, in a case of determining that a file in the specified file libraries is being leaked; wherein the alarm information is used for indicating that a file in the specified file libraries is being leaked.

As an optional implementation of the embodiment of the present disclosure, the processing unit 105 is further configured to transmit attribute information of the file operation event to a server, in a case of determining that a file in the specified file libraries is being leaked;

wherein the attribute information of the file operation event comprises at least one of identification information of the terminal device, identification information of the target file, and account information for logging in the terminal device.

As an optional implementation of the embodiment of the present disclosure, the processing unit 105 is further configured to prevent the file operation event from being performed, in a case of determining that the target file belongs to the specified file libraries.

The file leak detection apparatus provided by the present embodiment may perform the file leak detection method provided by the above-mentioned method embodiment, and the implementation principles and the technical effects thereof are similar, which are not described herein again.

Figure 11:
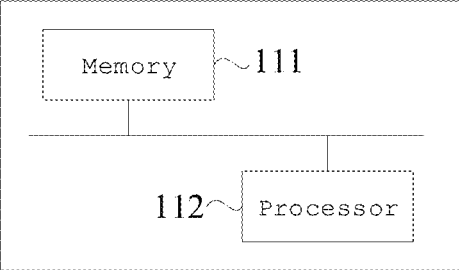
FIG. 11 shows a schematic hardware structure diagram of an electronic device provided by an embodiment of the present disclosure.

Based on the same inventive concept, an embodiment of the present disclosure further provides an electronic device. FIG. 11 is a schematic structural diagram of an electronic device provided by the embodiment of the present disclosure, and as shown in FIG. 11, the electronic device provided in the present embodiment comprises: a memory 111 configured to store a computer program and a processor 112 configured to perform the file leak detection method provided by the above-mentioned embodiment when the computer program is called. The electronic device in the embodiment of the present disclosure may include, but are not limited to, a mobile terminal, such as a mobile phone, a laptop, a digital broadcast receiver, a PDA (personal digital assistant), a PAD (tablet computers), a PMP (portable multimedia player), an on-board terminal (e.g., an on-board navigation terminal), and the like, as well as a fixed terminal, such as a digital TV, a desktop computer, and the like.

Based on the same inventive concept, an embodiment of the present disclosure further provides a non-transitory computer-readable storage medium having stored thereon a computer program which, when executed by a processor, causes the processor to implement the file leak detection method provided by the above-mentioned embodiment.

Based on the same inventive concept, an embodiment of the present disclosure further provides a computer program product which, when executed on a computer, causes the computer to implement the file leak detection method provided by the above-mentioned embodiment.

Based on the same inventive concept, an embodiment of the present disclosure further provides a computer program which, when executed by a processor, causes the processor to implement the file leak detection method provided by the above-mentioned embodiment.

As shall be appreciated by those skill in the art, embodiments of the present disclosure may be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product implemented on one or more computer-usable storage medium with computer-usable program codes contained therein.

The processor may be a Central Processing Unit (CPU), or may be another general processor, a Digital Signal Processor (DSP), an Application Specific Integrated Circuit (ASIC), a Field-Programmable Gate Array (FPGA) or another programmable logic device, a discrete gate or transistor logic device, a discrete hardware component, or the like. A general processor may be a microprocessor or the processor may be any conventional processor or the like.

The memory may include forms of volatile memory, Random Access Memory (RAM) and/or non-volatile memory, such as Read Only Memory (ROM) or flash memory (flash RAM), in a computer readable medium. The memory is an example of a computer-readable medium.

Computer readable medium includes permanent and non-permanent, movable and non-movable storage medium. Storage medium may achieve information storage by any method or technology, and information may be computer-readable instructions, a data structure, a unit of a program, or other data. Examples of computer storage medium include, but are not limited to, phase change memory (PRAM), Static Random Access Memory (SRAM), Dynamic Random Access Memory (DRAM), other types of Random Access Memory (RAM), Read Only Memory (ROM), Electrically Erasable Programmable Read Only Memory (EEPROM), flash memory or other memory technology, Compact Disc Read Only Memory (CD-ROM), Digital Versatile Disks (DVD) or other optical storage, magnetic cassettes, magnetic disk storage or another magnetic storage device, or any other non-transmission medium, which can be used to store information that can be accessed by a computing device. As defined herein, computer-readable medium do not include transitory computer-readable medium, such as a modulated data signal and a carrier wave.

Finally, it should be noted that, all the above embodiments are only intended to be used for illustrating the technical solutions of the present disclosure, and not for limiting the same; although the present disclosure has been described in detail with reference to the above-mentioned embodiments, those of ordinary skill in the art shall understand that the technical solutions described in the above-mentioned embodiments may still be modified, or some or all of the technical features may be equivalently replaced; however, such modifications or replacements will not cause the essence of the corresponding technical solutions to depart from the scope of the technical solutions of the embodiments of the present disclosure.

What is claimed is:

1. A file leak detection method, comprising:

acquiring a file operation event on a terminal device, wherein the file operation event is an event for performing a specified operation on a target file;

extracting, from the file operation event, a file path of the target file which the file operation event involves;

searching for file content of the target file in accordance with the file path, and performing a mapping process on the file content of the target file to obtain a file fingerprint of the target file, wherein the file fingerprint uniquely identifies the file content of the target file;

determining whether the target file belongs to specified file libraries based on the file path and the file fingerprint, wherein the specified file libraries are configured to dynamically maintain business files that need to be protected, and wherein the determining whether the target file belongs to the specified file libraries comprises determining whether the target file originates from preset file hosting platforms based on determining whether a preset field is contained in the file path; and determining that a file in the specified file libraries is being leaked in response to determining that the target file belongs to the specified file libraries.

2. The method according to claim 1, wherein the determining whether the target file belongs to specified file libraries based on the file path and the file fingerprint comprises:

determining whether the file path is contained in an index information library; wherein the index information library stores a file path and a file fingerprint of at least one file in the specified file libraries;

determining that the target file belongs to the specified file libraries, if the file path is contained in the index information library;

determining whether the file fingerprint is contained in the index information library, if the file path is not contained in the index information library; and determining that the target file belongs to the specified file libraries, if the file fingerprint is contained in the index information library.

3. The method according to claim 2, wherein in a case wherein the file fingerprint is not contained in the index information library, the method further comprises:

determining whether the target file originates from the preset file hosting platforms based on determining whether the preset field is contained in the file path;

determining a first file library which is a file warehouse of an item to which the target file belongs, if the target file originates from the preset file hosting platforms;

determining whether the first file library belongs to the specified file libraries; and determining that the target file belongs to the specified file libraries, if the first file library belongs to the specified file libraries.

4. The method according to claim 3, wherein in a case of determining that the first file library does not belong to the specified file libraries, the method further comprises:

determining whether a same-level file, a parent file of which is the same as that of the target file, originates from the preset file hosting platforms, in accordance with whether the preset field is contained in a same-level path which is a path of the same-level file;

determining a second file library which is a file warehouse of an item to which the same-level file belongs, if the same-level file originates from the preset file hosting platforms;

determining whether the second file library belongs to the specified file libraries; and determining that the target file belongs to the specified file libraries, if the second file library belongs to the specified file libraries.

5. The method according to claim 4, wherein in a case of determining that the second file library does not belong to the specified file libraries, the method further comprises:

determining whether at least one level of parent file of the target file originates from the preset file hosting platforms, in accordance with whether the preset field is contained in a parent path which is a path of the parent file;

determining a third file library which is a file warehouse of an item to which the parent file originating from the preset file hosting platforms belongs, if any level of the parent file originates from the preset file hosting platforms;

determining whether the third file library belongs to the specified file libraries; and determining that the target file belongs to the specified file libraries, if the third file library belongs to the specified file libraries.

6. The method according to claim 3, wherein the method further comprises:

adding the file path and the file fingerprint into the index information library, in a case of determining that the target file belongs to the specified file libraries.

7. The method according to claim 1, wherein the method further comprises:

transmitting alarm information to a server, wherein the alarm information is used for indicating that a file in the specified file libraries is being leaked, in a case of determining that a file in the specified file libraries is being leaked.

8. The method according to claim 1, wherein the method further comprises:

transmitting attribute information of the file operation event to a server, in a case of determining that a file in the specified file libraries is being leaked;

wherein the attribute information of the file operation event comprises at least one of identification information of the terminal device, identification information of the target file, and account information for logging in the terminal device.

9. The method according to claim 1, wherein the method further comprises:

preventing the file operation event from being performed, in a case of determining that a file in the specified file libraries is being leaked.

10. An electronic device, comprising: a memory configured to store a computer program and a processor configured to, when executes the computer program, cause the electronic device to implement the following file leak detection operations:

acquiring a file operation event on a terminal device, wherein the file operation event is an event for performing a specified operation on a target file;

extracting, from the file operation event, a file path of the target file which the file operation event involves;

searching for file content of the target file in accordance with the file path, and performing a mapping process on the file content of the target file to obtain a file fingerprint of the target file, wherein the file fingerprint uniquely identifies the file content of the target file;

determining whether the target file belongs to specified file libraries based on the file path and the file fingerprint, wherein the specified file libraries are configured to dynamically maintain business files that need to be protected, and wherein the determining whether the target file belongs to the specified file libraries comprises determining whether the target file originates from preset file hosting platforms based on determining whether a preset field is contained in the file path; and determining that a file in the specified file libraries is being leaked in response to determining that the target file belongs to the specified file libraries.

11. The electronic device according to claim 10, wherein the determining whether the target file belongs to specified file libraries based on the file path and the file fingerprint comprises:

determining whether the file path is contained in an index information library; wherein the index information library stores a file path and a file fingerprint of at least one file in the specified file libraries;

determining that the target file belongs to the specified file libraries, if the file path is contained in the index information library;

determining whether the file fingerprint is contained in the index information library, if the file path is not contained in the index information library; and determining that the target file belongs to the specified file libraries, if the file fingerprint is contained in the index information library.

12. The electronic device according to claim 11, wherein in a case wherein the file fingerprint is not contained in the index information library, the processor, when executes the computer program, causes the electronic device to further implement the following operations:

determining whether the target file originates from the preset file hosting platforms based on determining whether the preset field is contained in the file path;

determining a first file library which is a file warehouse of an item to which the target file belongs, if the target file originates from the preset file hosting platforms;

determining whether the first file library belongs to the specified file libraries; and determining that the target file belongs to the specified file libraries, if the first file library belongs to the specified file libraries.

13. The electronic device according to claim 12, wherein in a case of determining that the first file library does not belong to the specified file libraries, the processor, when executes the computer program, causes the electronic device to further implement the following operations:

determining whether a same-level file, a parent file of which is the same as that of the target file, originates from the preset file hosting platforms, in accordance with whether the preset field is contained in a same-level path which is a path of the same-level file;

determining a second file library which is a file warehouse of an item to which the same-level file belongs, if the same-level file originates from the preset file hosting platforms;

determining whether the second file library belongs to the specified file libraries; and determining that the target file belongs to the specified file libraries, if the second file library belongs to the specified file libraries.

14. The electronic device according to claim 13, wherein in a case of determining that the second file library does not belong to the specified file libraries, the processor, when executes the computer program, causes the electronic device to further implement the following operations:

determining whether at least one level of parent file of the target file originates from the preset file hosting platforms, in accordance with whether the preset field is contained in a parent path which is a path of the parent file;

determining a third file library which is a file warehouse of an item to which the parent file originating from the preset file hosting platforms belongs, if any level of the parent file originates from the preset file hosting platforms;

determining whether the third file library belongs to the specified file libraries; and determining that the target file belongs to the specified file libraries, if the third file library belongs to the specified file libraries.

15. The electronic device according to claim 12, wherein the processor, when executes the computer program, causes the electronic device to further implement the following operations:

adding the file path and the file fingerprint into the index information library, in a case of determining that the target file belongs to the specified file libraries.

16. A non-transitory computer-readable storage medium having stored thereon a computer program which, when executed by a processor, causes the processor to implement the following file leak detection operations:

acquiring a file operation event on a terminal device, wherein the file operation event is an event for performing a specified operation on a target file;

extracting, from the file operation event, a file path of the target file which the file operation event involves;

searching for file content of the target file in accordance with the file path, and performing a mapping process on the file content of the target file to obtain a file fingerprint of the target file, wherein the file fingerprint uniquely identifies the file content of the target file;

determining whether the target file belongs to specified file libraries based on the file path and the file fingerprint, wherein the specified file libraries configured to dynamically maintain business files that need to be protected, and wherein the determining whether the target file belongs to the specified file libraries comprises determining whether the target file originates from preset file hosting platforms based on determining whether a preset field is contained in the file path; and determining that a file in the specified file libraries is being leaked in response to determining that the target file belongs to the specified file libraries.

17. The computer-readable storage medium according to claim 16, wherein the determining whether the target file belongs to specified file libraries based on the file path and the file fingerprint comprises:

determining whether the file path is contained in an index information library; wherein the index information library stores a file path and a file fingerprint of at least one file in the specified file libraries;

determining that the target file belongs to the specified file libraries, if the file path is contained in the index information library;

determining whether the file fingerprint is contained in the index information library, if the file path is not contained in the index information library; and determining that the target file belongs to the specified file libraries, if the file fingerprint is contained in the index information library.

18. The computer-readable storage medium according to claim 17, wherein in a case wherein the file fingerprint is not contained in the index information library, the computer program, when executed by the processor, causes the processor to further implement the following operations:

determining whether the target file originates from the preset file hosting platforms based on determining whether the preset field is contained in the file path;

determining a first file library which is a file warehouse of an item to which the target file belongs, if the target file originates from the preset file hosting platforms;

determining whether the first file library belongs to the specified file libraries; and determining that the target file belongs to the specified file libraries, if the first file library belongs to the specified file libraries.

19. The computer-readable storage medium according to claim 18, wherein in a case of determining that the first file library does not belong to the specified file libraries, the computer program, when executed by the processor, causes the processor to further implement the following operations:

determining whether a same-level file, a parent file of which is the same as that of the target file, originates from the preset file hosting platforms, in accordance with whether the preset field is contained in a same-level path which is a path of the same-level file;

determining a second file library which is a file warehouse of an item to which the same-level file belongs, if the same-level file originates from the preset file hosting platforms;

determining whether the second file library belongs to the specified file libraries; and determining that the target file belongs to the specified file libraries, if the second file library belongs to the specified file libraries.

20. The computer-readable storage medium according to claim 19, wherein in a case of determining that the second file library does not belong to the specified file libraries, the computer program, when executed by the processor, causes the processor to further implement the following operations:

determining whether at least one level of parent file of the target file originates from the preset file hosting platforms, in accordance with whether the preset field is contained in a parent path which is a path of the parent file;

determining a third file library which is a file warehouse of an item to which the parent file originating from the preset file hosting platforms belongs, if any level of the parent file originates from the preset file hosting platforms;

determining whether the third file library belongs to the specified file libraries; and determining that the target file belongs to the specified file libraries, if the third file library belongs to the specified file libraries.

\* \* \* \* \*